July 29, 1952   R. P. LOGAN   2,605,220
ANAEROBIC DIGESTER
Filed June 16, 1950   3 Sheets-Sheet 1

INVENTOR:
ROBERT P. LOGAN,
BY
ATTORNEY

July 29, 1952

R. P. LOGAN 2,605,220

ANAEROBIC DIGESTER

Filed June 16, 1950

INVENTOR:
ROBERT P. LOGAN,
BY
Arthur Middleton
ATTORNEY

INVENTOR:
ROBERT P. LOGAN,
BY
Arthur Middleton
ATTORNEY

Patented July 29, 1952

2,605,220

UNITED STATES PATENT OFFICE 2,605,220

ANAEROBIC DIGESTER

Robert P. Logan, Portland, Oreg., assignor to The Dorr Company, Stamford, Conn., a corporation of Delaware Application June 16, 1950, Serial No. 168,586

4 Claims. (Cl. 210—2)

This invention relates to apparatus applicable for use in the treatment of anaerobically digestible wastes such as sewage sludge, industrial wastes such as distillery slops, yeast waste, straw board waste or other polluted waters. More particularly, this invention relates to the biologic digestion of sewage and industrial wastes polluted with solid substances on which anaerobic bacteria can feed and thus change into less obnoxious end products of the bacteria. When such bacteria feed on such polluted liquid suspensions, their end products usually include certain solids and certain liquids. The excreted solids are less obnoxious and are capable of being dried and disposed of but the excreted liquids are more obnoxious and must be further treated before release. The execreted solids, after being removed from the digester, are generally referred to as digested sludge while the excreted liquid, after being released from the digester, is usually referred to as digester supernatant.

It takes weeks of time to thoroughly digest a digester tank full of such waste, and indeed in the winter-time it may take months. So it is an object of this invention to improve digestion by making it possible to release digester supernatant from the digester more or less continually as it is formed rather than waiting for more extensive digestion. This has several advantages in that more waste can be added to the digester as space is made therein by the release of supernatant, and indeed, since the supernatant is an end product of the bacteria working in the digester, their activity is improved or enhanced by absence of increasingly large amounts of the inhibiting end product liquid.

It is another object of this invention to assure a minimum of digester solids being released with the released supernatant liquid, and indeed to retain such solids within the digester for the full period necessary for their digestion. And it is another object to maintain those retained suspended solids in a state of intense agitation in order to maximize bacterial treatment thereof by the anaerobic bacteria in the air-tight digester tank. Since in order to release continually supernatant liquid that is substantially solids free, it is necessary to have in the digester tank a zone of sedimenting quiescence, we have here two contradictory forces; namely, a zone of intense agitation for good digestion and a zone of quiescence for sedimentation. So it is another object of this invention so to arrange these opposing forces into zones that are in hydraulic communication and yet which are sufficiently functionally separate so that the agitation of one does not disturb the quiescence in the other, and vice versa. That hydraulic communication is important because it is also an object of this invention to continually return to the agitated zone those solids settled out of and kept from release with the supernatant.

The invention was primarily developed for biologically treating waste organic liquid suspensions according to a process involving anaerobically digesting the waste by steps involving intensely agitating such waste in a biologic treatment compartment of a closed-top tank and thereafter transferring quantities of the material undergoing treatment from the treating compartment into a settling zone provided within the same tank. Within this settling zone there is maintained a condition favorable to the sedimentation of settleable solids in the liquid.

So the advantages of this invention can be realized when liquid or organic waste in suspension to be treated is delivered by suitable feeding means into the treating compartment within a region whereat it comes under the operative influence of agitating means for subjecting the fed liquid to intense agitation and repetitive cycling. The liquids in the treating compartment and the liquid settling zone are separated from each other by a partial partition extending from emergence to submergence but it will be noted that, since the partition is only a partial one, there is constant hydraulic communication between the liquid portions in said compartment and said zone and that thereby there in fact exists a liquid body extending from the treating compartment to and into the settling zone. In other words, the liquid level of that portion of the body of liquid in said compartment and that portion of it in said zone will be alike and at a liquid level established by an overflow weir section provided within the settling zone and constituting part of an effluent releasing means leading from the tank. The construction is provided with feeding means which delivers the incoming material into the treating compartment; with means for the passing of a quantity of liquid displaced by said incoming feed from the treating compartment into the settling zone; and with outflow means for receiving a second displaced quantity of supernatant liquid which is passed as overflowed clarified but impure effluent from the settling zone to a region outside of the tank.

The agitating operations carried out within the treating compartment and the agitating disturbances effected in that compartment are antagonistic to the quiescent conditions required for the deposition of settleable solids within the settling zone to form sediment which passes from the settling zone because of a passage provided therefor leading from the lower portion of the settling zone.

An important aspect of the invention pertains to the construction and embodiment of the partial partition with liquid entrance ports for the transference of displaced agitated liquor from the treating compartment into the settling zone, and of the employment of shielding means deflecting plate provided between the liquid entrance or transfer ports on the one hand and the means located within the treating compartment for effecting violent agitation of the liquid in the tank on the other hand. Said shielding means or deflecting plate thereby provides means whereby disturbing agitative influences cannot pass through and are discouraged against entering said ports, whereby the operations that are contradictory or repugnant to each other can be performed within a single tank. In other words, whereby agitative disturbances realized within the treating compartment cannot reach and extend into the settling zone where they would upset quiescent conditions within that zone. To accomplish this, the partial partitioning means extends from an elevation above that of the normal liquid level of the body of liquid within the tank as determined by the overflow weir, to an elevation therebelow that is in submergence for a substantial distance within the body of liquid within the tank.

The partial partition preferably extends downwardly and outwardly towards the marginal wall of the tank and when the marginal wall of the tank is circular, for example, the partial partition is preferably circular or of symmetrical formation in horizontal cross-section. The lower portion of the partial partition preferably terminates spacedly above the floor and also in effect short of the interior of the marginal wall of the tank whereby to provide or leave a sediment passageway or sediment transfer area leading from the lower interior portion of the settling zone. Also as indicated, the upper end of the partial partition extends above the surface level of the liquid to avoid the passing of detrimental agitative or wave-like disturbances from the treating compartment over the upper edge of the partial partition into the settling zone.

As to the location of the liquid entrance ports or ported openings, this is such that there is preferably a submerged passage of the requisite displaced quantity of agitated liquid from the treating compartment into the upper portion of the settling zone. An important feature of the invention involves the introduction of shield means or flow deflecting plate located between the agitating means on the one hand and the liquid entrance ports which have been referred to as being located in or provided by the partition. Another feature involves the embodying in the apparatus of inwardly-extending gas-flow obstrucion baffles spaced below the lower ends of the partial partition and extending inwardly from the marginal wall of the tank a sufficient distance to block or prevent the entrance into the settling zone of gas rising from within the lower portion of the tank. It will be noted that if such rising gas were allowed to enter and pass upwardly within the settling zone, it would be detrimental to the desired quiescent conditions which should continue within the settling zone.

As to the function of the agitating means, it is preferred that there be employed a draft-tube and energy-supplying means (as for example a motivated propelling means) that function to suck and upwarly impel the liquid undergoing intense agitation within the treating zone and which also function to deliver such recycled liquid whereby it has a downwardly-extending return path. In such installation the shield means as provided by a depending plate is installed in a manner indicated whereby to deflect the downflowing liquid away from the liquid entrance ports.

A closed-top treating tank of the kind referred to is preferably provided with gas release means leading from the upper interior portion thereof for permitting the passage or escape of accumulated gases, particularly when and where the tank is used for carrying out the anaerobic digestion of fluid waste containing organic solids to be digested. Under such conditions of use the clarified effluent outflow means should be of a character to permit the release and passing of the clarified effluent from the tank while at the same time avoiding or minimizing any backflow of any air into the tank.

The tank is preferably provided with a valve-controlled sludge discharge conduit leading from the lower portion of the tank and also with a valve-controlled liquid-withdrawal pipe or conduit leading from a submerged locality within but spacedly above the floor of the tank.

The features of construction, as well as others relative to the treating apparatus or means as a whole, will be described in greater detail in the subsequent portions of this specification.

By the drawings which constitute a part of this specification there are illustrated two forms of apparatus, both of which function substantially alike. Form 1 is illustrated by Figs. 1 to 4, while Form 2 is illustrated by Figs. 5 and 6. As to said figures.

Figure 1:
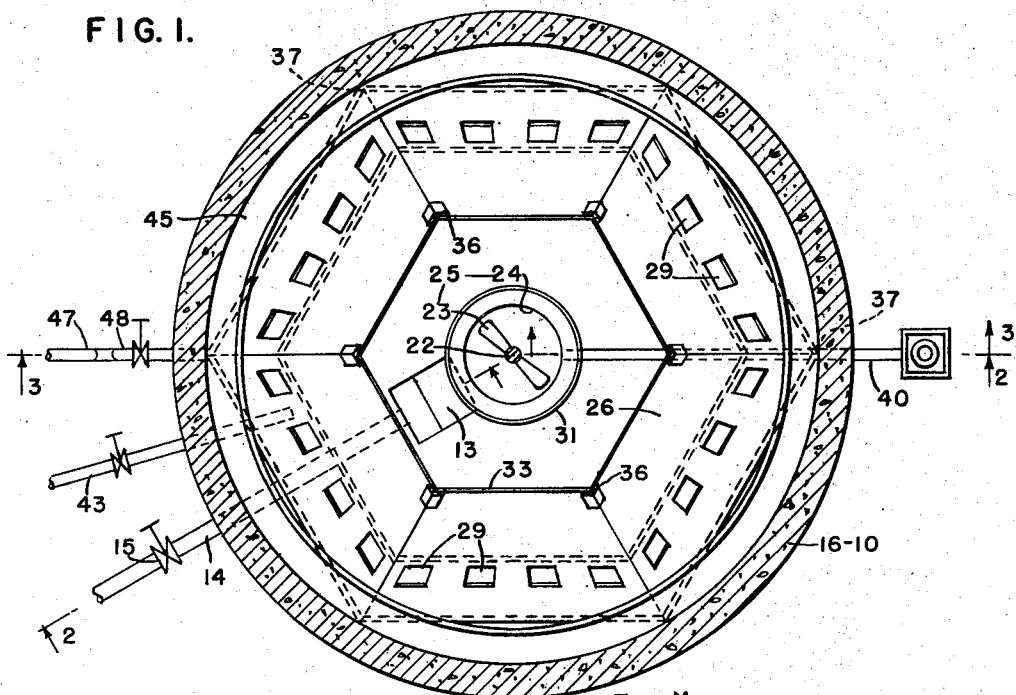
Fig. 1 is a horizontal sectional view of the apparatus of Fig. 2 taken as on the broken line 1—1 of Fig. 2, indicating sections of different elevations.
Figure 2:
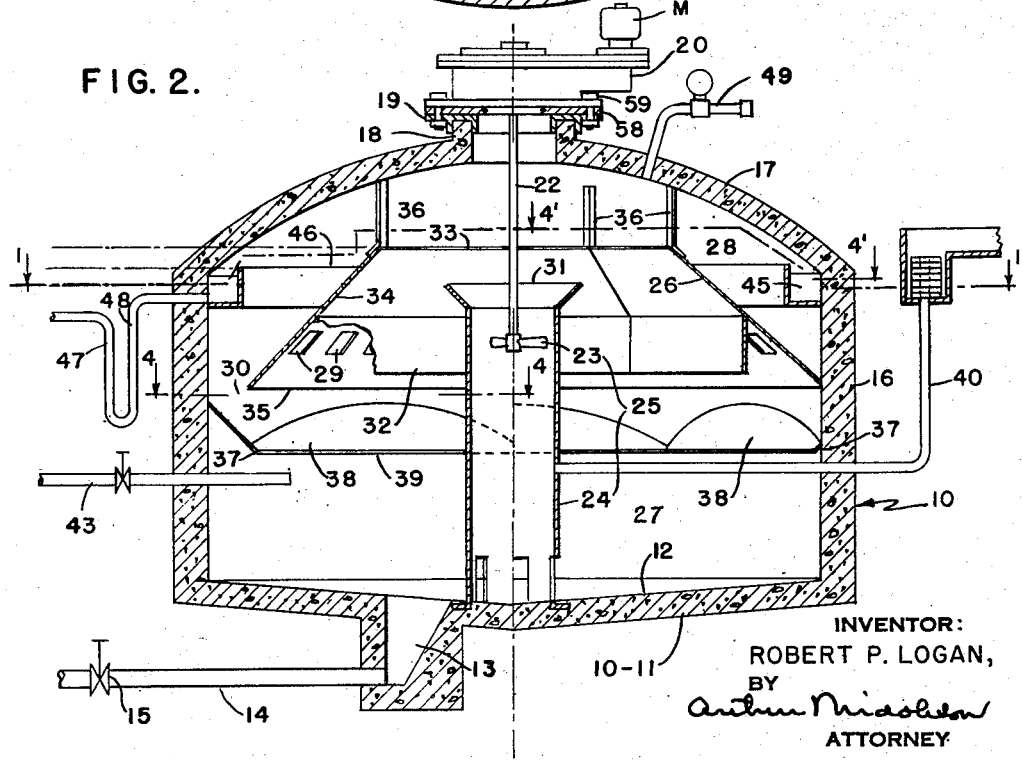
Fig. 2 is a vertical sectional view taken as on vertical planes indicated as to location by the broken line 2—2 of Fig. 1.
Figure 3:
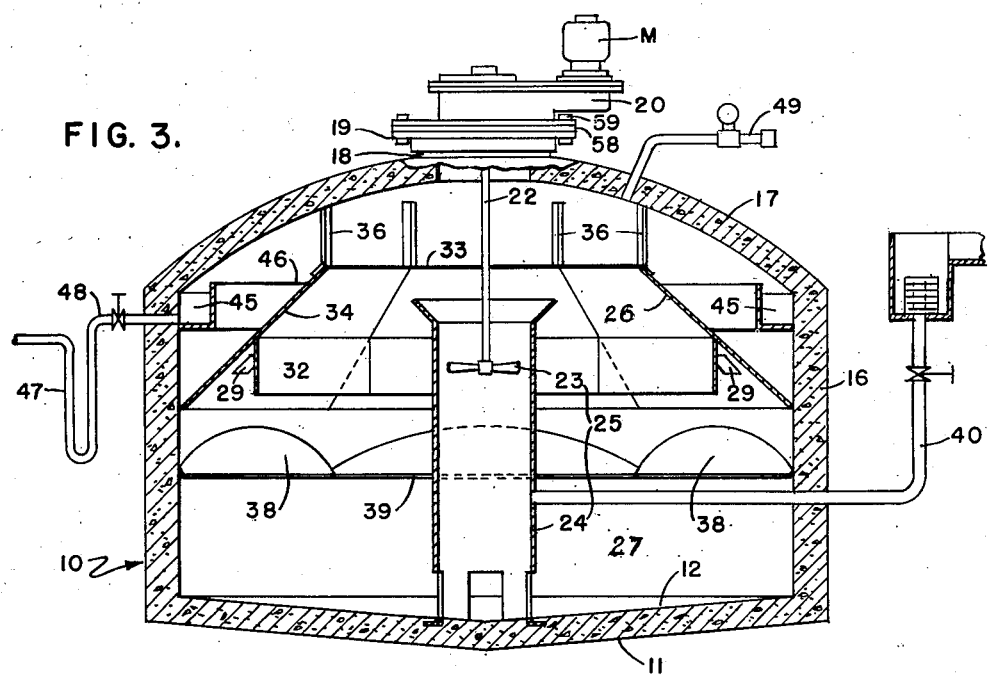
Fig. 3 is a vertical sectional view taken as on the plane indicated by the line 3—3 of Fig. 1 looking in the direction of the arrows indicated by the number 3.
Figure 4:
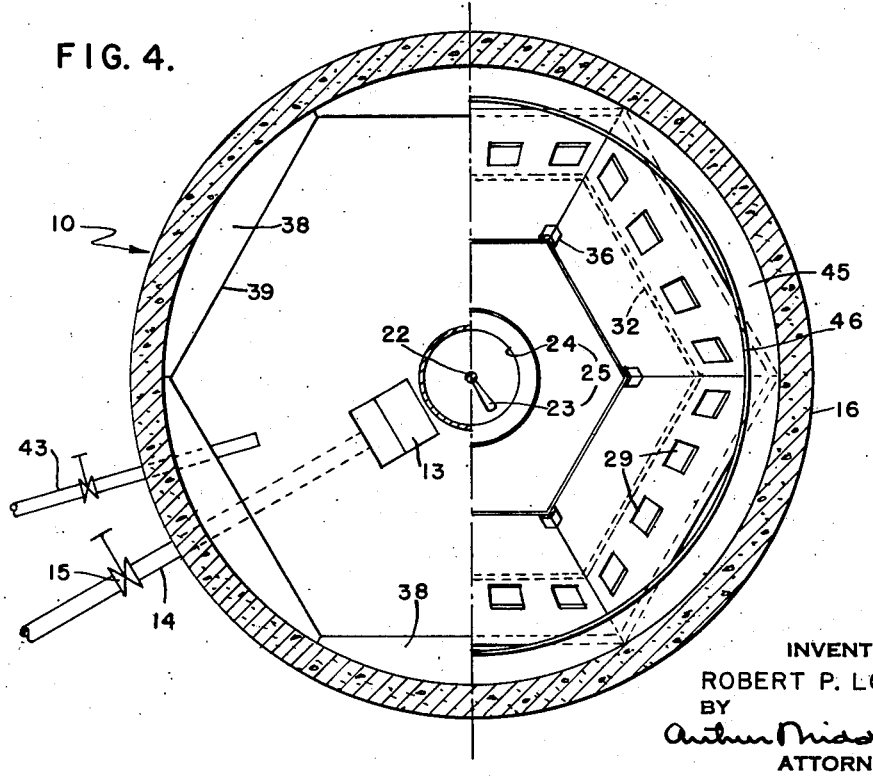
Fig. 4 is a horizontal sectional view of which the left half is taken at an elevation indicated by the dot-and-dash line 4—4 of Fig. 2, while the right half is taken at different elevations indicated by the broken dot-and-dash line $4^1$—$4^1$ of Fig. 2.
Figure 5:
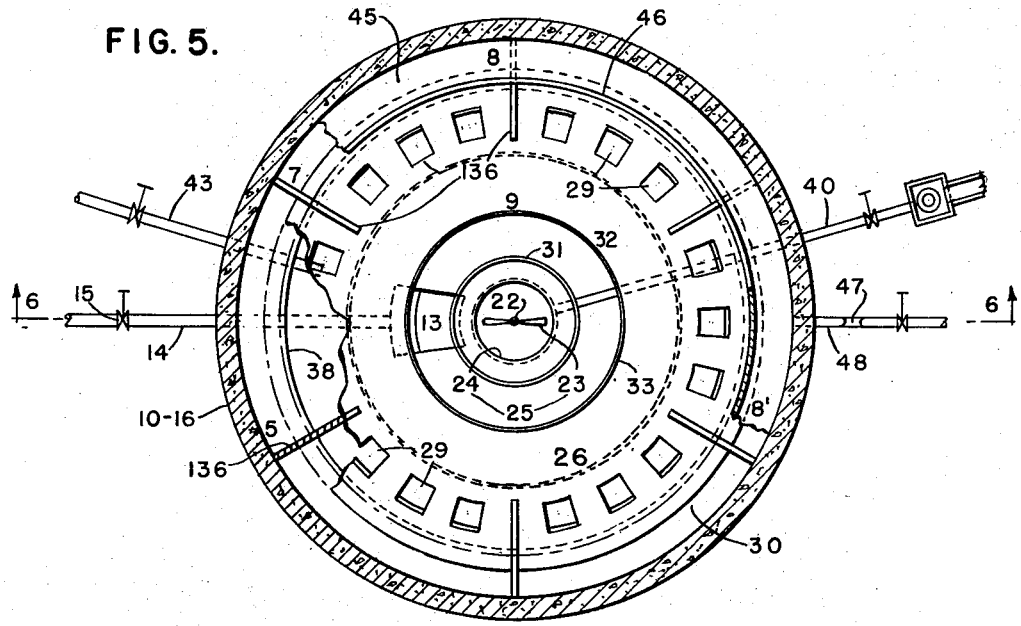
Figure 6:
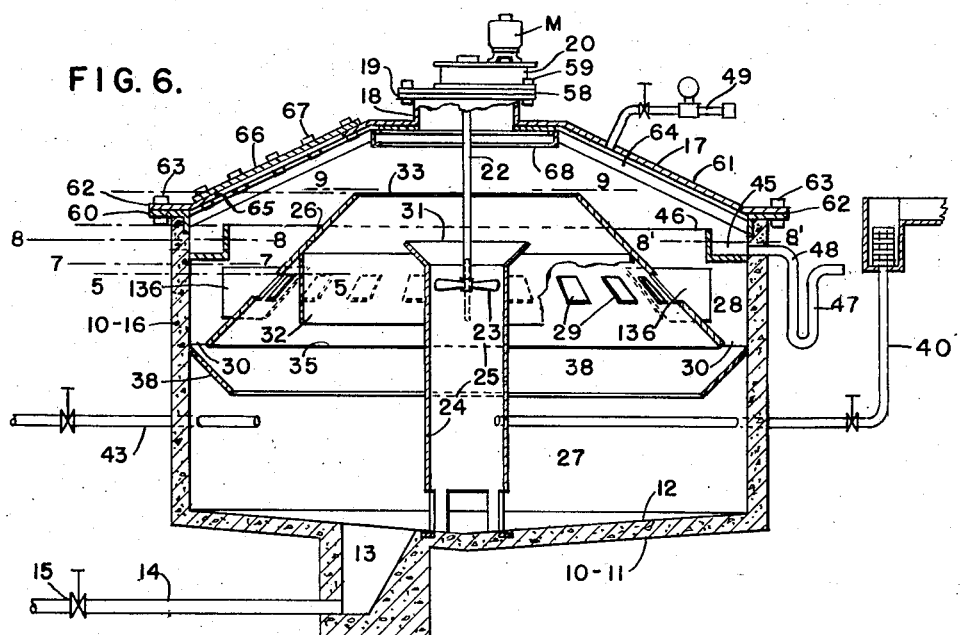

Fig. 5 is a horizontal sectional view of the apparatus of Fig. 6 taken at diverse elevations of Fig. 6. In connection with this Fig. 5 it will be noted that a section 5 thereof is taken at elevation indicated by the line 5—5 on Fig. 6; a section 7 thereof is taken at an elevation indicated by the line 7—7 on Fig. 6; sections 8, 9 and $8^1$ thereof are taken at elevations indicated respectively by the broken lines 8—8, 9—9 and $8^1$—$8^1$ on Fig. 6.

Fig. 6 is a vertical cross-section of the apparatus of Fig. 5 and is a view taken as on a vertical plane indicated by the dot-and-dash line 6—6 of Fig. 5.

Reference is now made to the drawings in detail.

In connection with the drawings and the description thereof, it is here noted that like reference characters refer to like functioning parts. With respect to the two forms described, Form 1 will first be described in detail, after which structural differences as between Form 2 and Form 1 will be pointed out.

APPARATUS OF FIGS. 1 TO 4

*Form 1*

Here there is employed a closed-top tank 10 having a bottom 11 providing a floor 12 that slopes downwardly and inwardly. This bottom also has a depressed portion providing a sump 13 from which there extends a sediment-discharge pipe 14 provided with a control valve 15.

A marginal wall 16 rises from said bottom and carries at the top thereof a closure top section 17 having an upwardly-extending annular portion 18 concentric with the marginal wall. This annular portion 18 is topped as by means of a flanged ring 19 fixedly secured in place. This ring serves as a member to which flanged housing 20 of a motivated speed-reducing and power transmission mechanism is detachably connected in any suitable manner as by bolting to said ring. A motor M actuates the speed-reducing and power transmission mechanism, which in turn drives a suitably supported descending shaft 22 carrying at the lower end thereof a liquid-lifting propeller 23. This propeller is located within an upwardly-extending draft-tube 24. The mechanism which includes this propeller and draft-tube constitutes that which is herein referred to as a motivated pumping means 25 for repetitively cycling liquid lifted thereby and for imparting violent agitation to that section of the body of liquid thus served by the pumping means.

The interior of this tank 10 is divided by a partial partition 26 into an agitation compartment 27, within which the pumping means is located, and a settling zone 28 into which there is received to be held in quiescence liquid which has been previously agitated and recycled in the agitating compartment.

The body of liquid within the tank provides a section being treated in the agitation compartment 27 and a section held in quiescent condition favorable to the sedimentation of solids in the settling zone 28. The section in the agitation compartment and the section in the settling zone are in constant hydraulic communciation since the partition 26 is only a partial one.

The partial partition 26 is preferably embodied in the tank so that there is left or provided a sediment discharge passageway or passageways at 30 leading downwardly from the settling zone towards and into an underlying portion of the agitation compartment. The agitation compartment and the settling zone represent body sections of the liquid body of which the requisite functioning conditions for the agitation compartment are repugnant or antagonistic to the requisite quiescent conditions for the settling zone.

Important aspects of the invention revolve about the embodying in the said tank of the partial partition 26, which is installed therein so that it can functionally divide the tank into the treating section or agitation compartment 27, wherein a violent agitation can take place, on the one hand, and the quiescent section within the settling zone 28, wherein conditions favorable to quiescent settling obtain.

In the construction shown the partial partition provides or is provided with submerged liquid entrance ports 29 leading from the agitation compartment 27 into the settling zone 28. There is functionally disposed between said partition 26 on the one hand and the delivering end portion 31 of the draft-tube 24 on the other hand a shield means embodying a depending ring or hollow shield member 32, hexagonal in plan and located for diverting or deflecting recirculating liquid whereby detrimental agitative flow effects are prevented from entering and passing through the liquid entrance ports 29 and thence into the settling zone.

The partial partition 26, as installed, has an unsubmerged upper end 33. It slopes downwardly and outwardly. The main portion 34 thereof is submerged within the body of liquid within the tank and the submerged lower end 35 is spaced above the floor of the tank and from the inner face of the marginal wall 16 of the tank whereby there is left or provided sediment passageways 30 or sediment passage area, as the passageways collectively may be termed. These passageways 30, or passage area provided thereby, lead from the lower portion of the settling zone 28 downwardly into the agitation compartment 27. This partial partition may be supported in place as by means of hangers 36 depending from the closure top section 17.

There are also installed in the apparatus baffle members 38, collectively constituting a baffle means, located below and spaced from the lower ends 35 of the partial partition. These baffle members or baffle means, as they may be collectively considered, extend inwardly from the marginal wall of the tank a sufficient distance whereby to prevent or avoid flow of gas bubbles from the agitation compartment into the sediment discharge passage area 30. Except for the baffle members provided at 38, rising gas bubbles might enter the settling zone and upset the quiescent conditions necessary and whereby otherwise the sedimentation operation could not be carried out.

A feeding means 40 leads from the exterior of the tank into the agitation zone and is provided for supplying the impure liquid to be treated and for delivering the same into the treating compartment, more particularly into a region thereof whereat the liquid comes under the suction influence of the draft-tube 24 of the pumping or agitating means 25 whereby the incoming liquid early becomes intimately mixed with the liquid of said compartment and which mixed liquid is repetitively cycled therein. This feeding means is preferably constructed for passing feed material into the tank according to operative requirements without permitting a flow of air therethrough into the tank.

The marginal wall 16 carries therein an effluent launder 45 having an overflow weir edge 46 located in the settling zone and thusly determines the normal surface level of the body of liquid within the tank, which body of liquid includes not only the section undergoing agitative treatment within the compartment 27, and the section to be maintained in quiescent condition within the settling zone 28, but also those portions of liquid etxending through the sediment discharge passageways 30 and also those portions extending through the liquid entrance ports 29. In connection with the foregoing it will be noted that the upper edge 33 of the partial partition is at elevation higher than that of the overflow weir edge 46, also so that the upper margins of the several liquid inflow ports 29 are at elevation lower than that of the overflow weir edge and that the lower margins of said ports 29 are at elevation higher than that of the lower edges 35 of the partial partition.

The effluent launder with the overflow weir edge 46 constitutes a part of a supernatant outflow means 47 leading to a region outside of the tank and this effluent outflow means is constructed, for example, so as to include a U conduit section 48 which serves as an outflow member leading from the tank but constructed for minimizing or preventing backflow of air into the closed tank.

From the upper interior portion of the closed tank there extends a gas release means 49, by which excess accumulation of gases of the process can be released while avoiding backflow of air into the tank.

The tank is also provided with a valve-controlled pipe 43 leading from the agitation compartment 27 at an elevation below that of the settling zone 28. The intake end of pipe 43 is spacedly disposed above that of the floor 12 of the tank.

Respecting the partial partition being described, it will be noted that in plan it is in the form of a rectangular polygon composed of connected flat plates. It has inner and outer surface contours, each resembling the surface of a polyhedron. This partial partition is so constructed that apexes 37 at the lower portion thereof extend practically to the wall of the tank. Between these apexes there are the sediment discharge passageways 30 or sediment transfer areas heretofore referred to and, as previously mentioned, they provide hydraulic communication between the agitation compartment 27 and the settling zone 28.

It has heretofore been indicated that this tank is employable for receiving and treating impure liquids. In its specific form it has been designed for use as a biologic digester for the treatment of impure liquids, such as sewage, or industrial waste liquids containing organic waste material, such as distillery slops, yeast waste, straw board waste and the like. It is adaptable to certain other uses, as in the treating of liquid to overcome objectionable color, hardness or turbid characteristics where the treating process involves as a requisite thereof agitation in the treating zone and subsequent quiescent conditions in a settling zone to remove from the treated liquid settleable solids in the liquid passing from the agitation compartment.

The tank 10, the partial partition 26 and the draft-tube 24 have concentric arrangement. In effect a horizontal cross-section through the agitation compartment and the settling zone shows an inlying symmetrical central section of the agitated liquid surrounded by a contiguous outlying section of quiescent liquid of substantially annular form. A vertical cross-section through the center line of the tank discloses the settling zone as defined by a wide top, lower open-ended V formation in which the quiescent liquid therein directly overlying a truncated, substantially cone-shaped portion of agitated liquid; there being low sediment transfer passageways or areas 30 leading from the lower portion of the open-ended V, while the upper part of the quiescent section and the upper part of the agitated section are separated from each other except as to submerged liquid entrance ported area 29 shielded by plates providing a ring 39 depending from the partial partition and serving for diverting or deflecting disturbing agitative effects from entering such ported area whereby, except for such shield plates on ring 39 the quiescent condition within the settling zone would be disturbed. The tank construction just referred to leads to a construction which is small but having efficient operating capacity. The tank has a relatively large and deep agitation compartment tapering to a small top for holding liquid undergoing agitation. The tank provides a settling zone which is shallow but having a large surface area. The quantity of liquid held or retained in the settling zone of low open-ended V formation is relatively small but of a character favorable for the requisite sedimentation of settleable solids in said zone. The quantity of liquid held for treatment within the agitation compartment is relatively large. By the same token the period of detention for the liquid undergoing treatment in said agitation compartment is relatively long. This provides conditions favorable to effecting proper operation within the apparatus hereof.

Respecting the feeding of liquid for treatment into the tank and the discharge of clarified liquid to a region outside of the tank, it will be noted that:

(1) According to the quantity of liquid supplied as feed by the means 40 and delivery into the low suction section of the draft-tube 24, there is effected (2) A consequent displacement of a corresponding quantity of liquid from the agitation zone—primarily into and through the liquid entrance ports 29—into the settling zone, and (3) A consequent displacement of a corresponding quantity of supernatant liquid past the overflow weir edge 46 into the effluent launder 45 and thence on its way from the tank by means of the U-shaped conduit 48 constituting part of the supernatant outflow means 47.

APPARATUS OF FIGS. 5 AND 6

Form 2

It has heretofore been pointed out that like reference characters apply to like functioning parts and this statement applies even though certain important functioning parts have some differences in shape or embodiment.

The apparatus of Form 2 functions substantially the same as the apparatus of Form 1.

The structural differences, not the functional differences, as to Form 2 as compared with Form 1, revolve about the utilization of:

(1) A partial partitioning means 26 which in horizontal cross-section is circular in plan and is of a shape resembling the surface of a truncated cone with the small end uppermost;

(2) A shield member 32 is circular in plan, and (3) A baffle member or means 38, circular in plan, is provided by a ring-shaped section resembling the surface of a truncated cone and disposed in the apparatus with the large and uppermost while the inwardly and downwardly extending portion of the circular ring-shaped section extends below the lower end of the partial partition.

In the apparatus of Form 2 there are also details of construction respecting the roof or closure top of the tank somewhat different from those shown in Form 1.

Respecting the partial partition, or partial partitioning means 26 as this member is alternatively called, it will be noted that this member in Form 2 is supported in place through the medium of six corner plates 136 extending radially inwardly from the marginal wall 16. In Form 1 the partial partition 26 is supported by hangers 36 depending from the closure top 17. As to the closure top of Form 2 this is designated 17 but is of metal plate construction.

To support this top the marginal wall 16 of the tank has been equipped with a ring 60 having an outwardly extending flange. This ring is fixedly secured in place at the upper end of the wall.

The closure top or roof construction 17 of the Form 2 has a marginal flanged portion 62 by which this closure top is secured in place by bolts 63. As to this specific roof construction 17, it is formed of upwardly and inwardly sloping plate sections 61 secured together as by welding or in any other suitable manner and it provides the flanged rim portion 62 just referred to. The roof is also constructed so as to provide an upwardly extending portion 18 topped by an outwardly extending flange 19 upon which there is located the flanged housing 20 of the motivated speed-reducing and power transmission mechanism which in turn drives the suitably supported descending shaft 22. As in the case of the form previously described, this housing has an outwardly extending flanged section 58 and is secured in place on the flange 19 by means of bolts 59. Furthermore, as to the specific roof construction 17, there is provided a manhole or access opening 65 normally sealed by a manhole cover 66 held in place by bolts or studs 67.

This closure top or roof construction 17 also has a central stiffening ring 68 secured in place and constituting a part thereof. This roof construction also embodies upwardly and inwardly extending stiffening ribs 64.

Except as indicated, the structures of both forms of apparatus are substantially alike, whereby each of the forms described functions in a manner equivalent to the other, or substantially so. The descriptions previously given with respect to the Forms 1 and 2, as to the mode of operation and adaptability of operation of each, are substantially alike and intended to be so. A comparison of the apparatus of Form 2 with the apparatus of Form 1 will disclose that all functional parts of this form are possessed and realized by the other also, that the description of Form 1 as to its structure and mode of operation applies to Form 2 and that any structural differences embodied in or by Form 2 have been pointed out and described in conjunction with that portion of the specification specifically made with respect thereto and that further comment with regard thereto would be superfluous.

I claim:

1. An anaerobic digester wherein suspended putrescible solids can be biologically digested, comprising a closed tank having side walls with a bottom and a top provided with gas withdrawal means for maintaining therein a body of such liquid, means for feeding such liquid to the tank, overflow means for discharging from the tank at a level determined thereby treated liquid from which such solids have settled, discharge means for withdrawing from the tank settled solids as sludge, a draft tube terminating beneath the liquid level through which the suspension is impelled from the bottom to the top of the liquid body to descend within the space surrounding the draft tube while digestion-induced gas bubbles in the impelled suspension are released therefrom at the liquid level within an area encircled by an endless curtain baffle hereinafter defined, such an endless baffle that is smaller in diameter than the tank to provide communicating passage between the tank and the lower edge of the baffle and that slopes downwardly as well as outwardly to define an upper limit of a body of turbulent digesting liquid as well as a lower limit of an annular body of relatively quiescent liquid, said curtain baffle having a plurality of submerged ports therethrough located above the lower edge of the baffle at a horizontal distance inwardly from the overflow means through which ports pass streams of suspended solids to rise relatively non-turbulently from the turbulent body into the quiescent body while a quantity of solids settling from the quiescent body onto the baffle descend along its slope to pass through the communicating passage between the periphery of the baffle and the tank into the turbulent body while treated liquid of the quiescent annular body passes from the tank by way of the overflow means.

2. Sewage sludge digester according to claim 1, with the addition that the sloping baffle is provided with depending auxiliary baffle means for shielding said ports from turbulence of the turbulent liquid body.

3. Sewage sludge digester according to claim 1, with the addition that the sloping baffle is provided with depending auxiliary baffle means for shielding said ports from turbulence of the turbulent liquid body as well as with inwardly extending and downwardly inclined further baffle means supported from the tank walls and downwardly spaced from the lower edge of the sloping baffle.

4. An anaerobic digester wherein suspended putrescible solids can be biologically digested, comprising a closed tank having side walls with a bottom and a top provided with gas withdrawal means for maintaining therein a body of such liquid, means for feeding such liquid to the tank, overflow means for discharging from the tank at a level determined thereby treated liquid from which such solids have settled, discharge means for withdrawing from the tank settled solids as sludge, a draft tube terminating beneath said liquid level through which the suspension is impelled between the bottom and the top of the liquid body so that digestion-induced gas bubbles in the impelled suspension are released therefrom at the liquid level from the liquid with an area encircled by an endless curtain baffle hereinafter defined, and such an endless baffle that is smaller in diameter than the tank to provide communicating passage between the tank and the lower edge of the baffle and that slopes downward as as well as outwardly to define an upper limit of a body of turbulent digesting liquid as well as a lower limit of an annular body of relatively quiescent liuid, said curtain baffle having a plurality of submerged ports therethrough above its lower edge at a horizontal distance inwardly from the overflow means through which ports pass streams of suspended solids to rise relatively non-turbulently from the turbulent body into the quiescent body while a quantity of solids settling from the quiescent body onto the baffle descend along its slope to pass through the communicating passage between the periphery of the baffle and the tank into the turbulent body while treated liquid of the quiescent annular body passes from the tank by way of the overflow means.

ROBERT P. LOGAN.

REFERENCES CITED

The following references are of record in the file of this patent:

UNITED STATES PATENTS

| Number | Name | Date |
| --- | --- | --- |
| 1,722,945 | Pruss | July 30, 1929 |
| 2,188,847 | Streander | Jan. 30, 1940 |
| 2,348,125 | Green | May 2, 1944 |
| 2,506,927 | Kelly | May 9, 1950 |